Dec. 27, 1927.

P. W. LEFFLAND 1,654,042

SUPPORT FOR PARASITIC GROWTHS

Filed Aug. 25, 1924    3 Sheets-Sheet 1

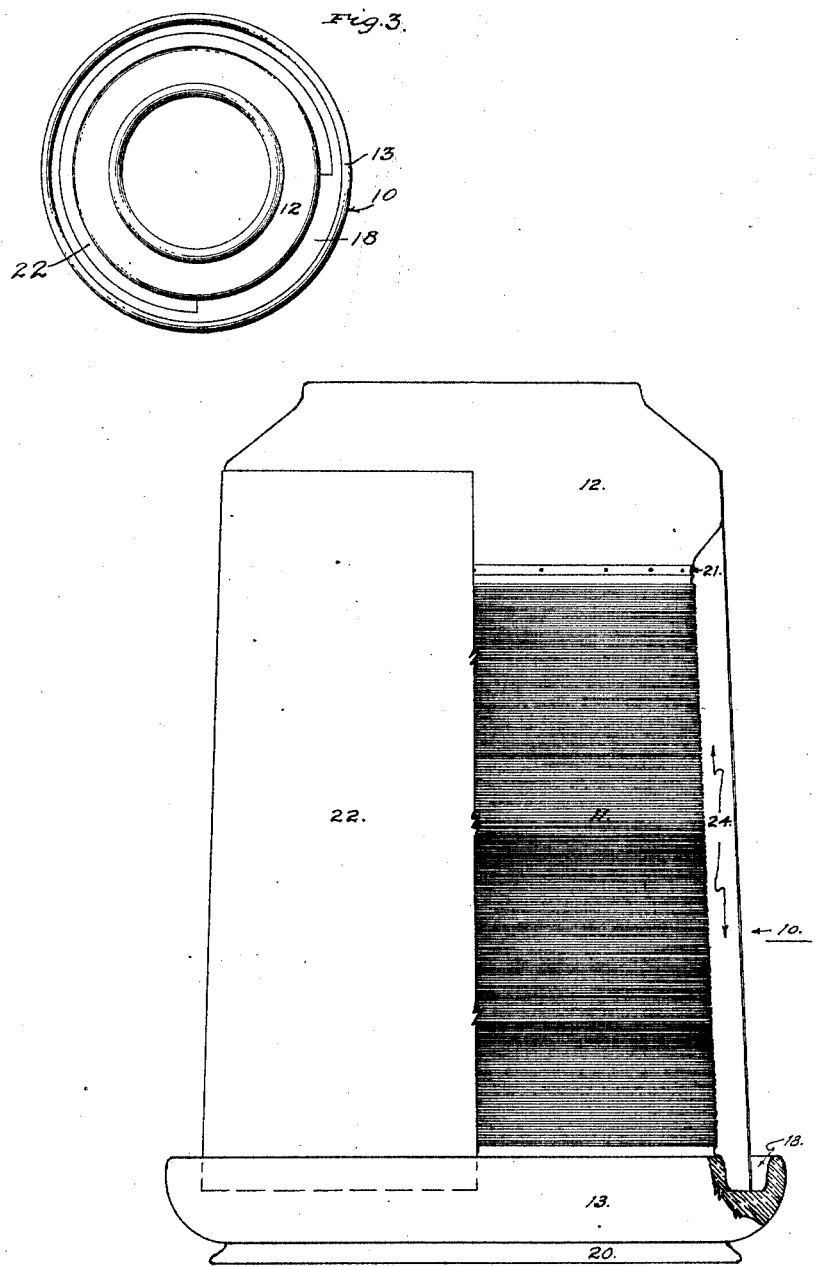

Dec. 27, 1927.
P. W. LEFFLAND
1,654,042
SUPPORT FOR PARASITIC GROWTHS
Filed Aug. 25, 1924     3 Sheets-Sheet 3
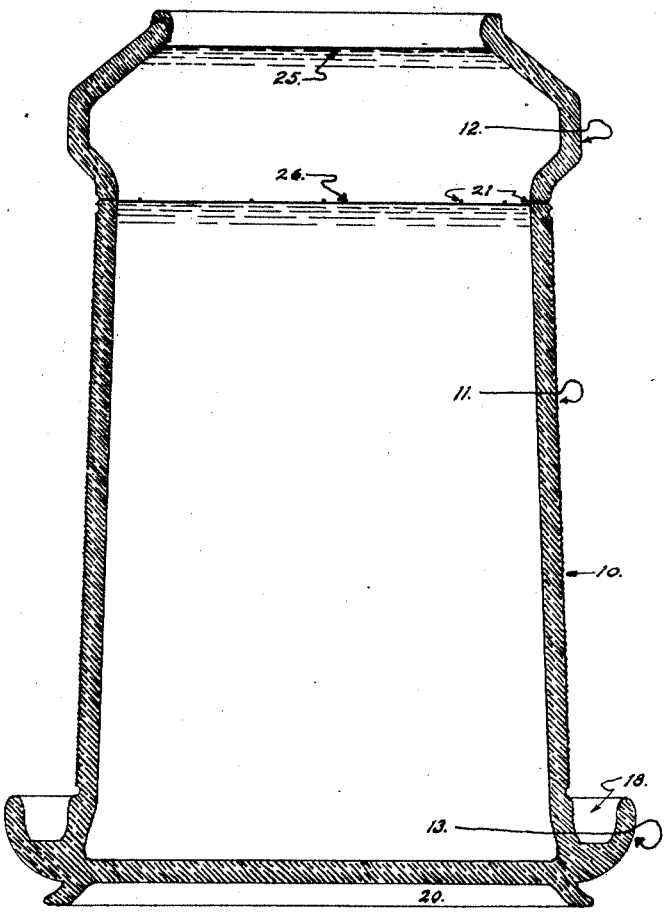

Patented Dec. 27, 1927.

1,654,042

UNITED STATES PATENT OFFICE.

PAUL W. LEFFLAND, OF VICTORIA, TEXAS.

SUPPORT FOR PARASITIC GROWTHS.

Application filed August 25, 1924. Serial No. 733,986.

This invention contemplates a novel flower vase designed and primarily intended for use in the capacity of a support for parasitic growths or plants.

The nature and the advantages of the invention will be better understood when the following detailed description is read in connection with the accompanying drawings, the invention residing in the construction, combination and arrangement of parts as claimed.

In the drawings forming parts of this application, like numerals of reference indicate similar parts in the several views, and wherein:

Figure 2 is a view in elevation of the vase showing the latter associated with the cover used by my method of developing such growths, the cover being partly in section and a small portion of annular trough 18, being partly in section, to show fitting.

Figure 3 is a direct top plan view of Figure 2.

Figure 4 is a sectional view of vase taken on the line 4—4 of Figure 1.

Figure 1:
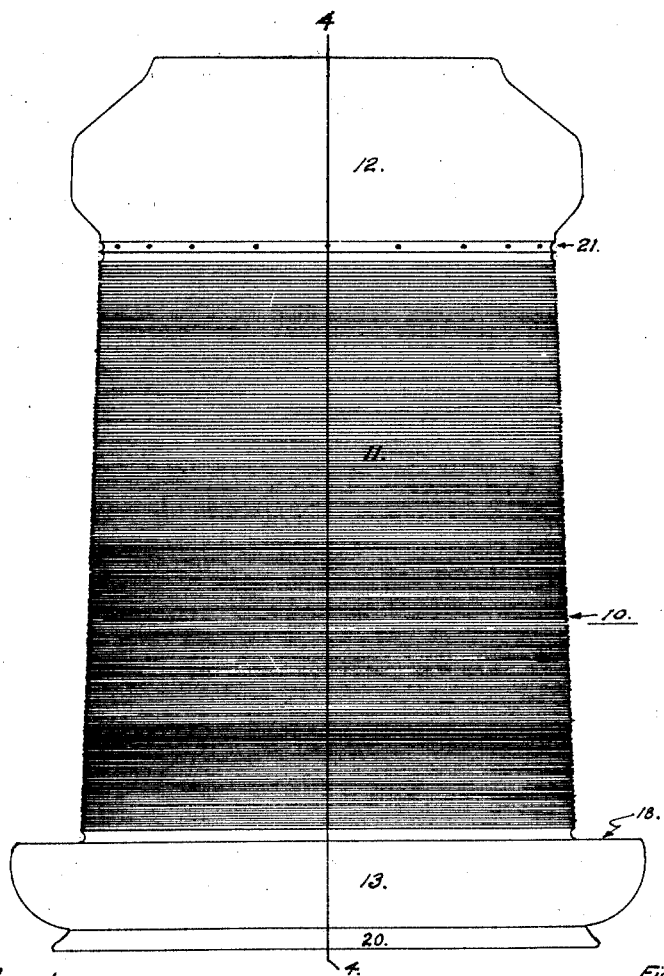
Figure 1 is a view in elevation of a vase constructed in accordance with the present invention.

Referring to the drawing in detail, 10 indicates a vase adapted to be utilized as a support for parasitic growths or plants, and also designed to maintain the water contained therein at a low temperature. This vase can be constructed from any suitable porous material, and may also vary in size and configuration without departing from the spirit of the invention. While porous material is used in the production of this vase, it is to be understood that the major portion of the body only is porous, such portion being indicated at 11, as it is about this surface that the plant or growth is supported. The upper and lower portions of this vase indicated at 12 and 13 respectively are non-porous, and are adapted to be enameled, painted or otherwise treated to add generally to the ornamentality of the vase. The top of the vase is open to receive cut flowers. It will also be noted that the main or body portion of the vase is preferably tapered, although this is not an essential characteristic of the invention, and surrounding the lower edge of the vase is a trough 18 positioned to receive cover 22, forming in part, by combination, the air tight and moist chamber 24, and to catch or receive any surplus moisture which may pass down the exterior of the vase and of course not used by the plant growth. The bottom of the vase may or may not be provided with feet or a supporting annulus 20. The vase is further provided at a point immediately above the growth or plant, with a circumferential series of irrigating openings 21, of appreciable size to quickly wet the growth portion when desired to irrigate same.

In accordance with my method of developing such plant growths, I make use of an isinglass, celluloid or similar cover 22, which is in the nature of a casing open at both ends, and designed to be slipped over the vase as shown in the drawings. The upper end of this cover 22 contacts the vase adjacent the top thereof to provide a close fit, while the lower edge of the cover is received by the trough 18. However the major portion of this cover is spaced from the body of the vase, this space defining a moist chamber 24. The purpose of this cover will be presently described.

In the use of the invention, the seed from which the plant grows is placed on the exterior surface of the vase 10, which surface is corrugated or otherwise roughened as shown to assist the seed in clinging to the outer surface of the vase. For instance, chia seed may be used, which character of seed furnishes a sort of an adhesive upon soaking for planting, and when the seed is rubbed on with the fingers, that is rubbed over the roughened surface of the vase, it clings to the exterior thereof. The plant growing from this seed does not peel, fall or sag from its own weight, but extends laterally from the vase at an angle which eventually has a very artistic appearance. The glue or adhesive substance characteristic with seeds of this kind, eventually passes off with the air, while the roots of the plant or growth weave together in a substantial manner. However, the root growth itself can be conveniently and easily taken off the vase, leaving a clean surface for the use of another kind of seed. Now, if such seed has been arranged upon the exterior of the vase and in a dry state, the latter is filled with water up to the water line 25, and is of course allowed to irrigate through the irrigation holes above mentioned, to the water line 26. This practice is followed for the purpose of wetting the seed. The irrigation should be repeated approximately six or seven times.

With the seed or growth portion now in a wet condition, the cover 22 is slipped over the vase forming the moist chamber above referred to, with a view of maintaining the seed in its present wet condition, and to insure uniform growth by eliminating dryness or rather its drying, and this unevenly caused by air currents or other outside forces. The cover is allowed to remain in this position for an appreciable length of time in order to maintain the seed in a moistened condition, thereby sufficiently causing the seed to root and draw their own moisture from the vase through the pores of the material from which the latter is made. The cover is then removed. It is of course understood that the outer cover avoids the necessity of using an extra porous material, which would seep too greatly moisture at all times, and cause the growth to mildew or rot by the reason of this surplus amount of unchecked moisture. With a parasitic growth support of this character it is further contended that the growth on the exterior of the vase, drawing water through the pores of the same will maintain the water on the interior of the vase at a low degree of temperature; and serve in doing so as a more satisfactory and proper flower vase. In an ordinary vase, the water quickly becomes warm and sour, with the result that it must be changed often and with the result that cut flowers will not keep as long as they otherwise would if the vase contained cold water.

While it is believed that from the foregoing description, the nature and advantages of the invention will be readily apparent, I desire to have it understood that I do not limit myself to what is herein shown and described and that such changes may be resorted to when desired as fall within the scope of what is claimed.

Having thus described the invention, I claim:

In combination, a flower vase adapted to constitute a support for parasitic growths, and including a portion constructed of porous material and irrigating holes immediately above said portion, an annular trough formed by the vase and surrounding the latter adjacent the bottom thereof, and an air tight cover designed to be slipped over the vase with its upper end contacting the latter, and its lower end received by the trough, and a moist chamber defined by the intervening space between the vase and cover.

In testimony whereof I affix my signature.

PAUL W. LEFFLAND.